US011122877B2

(12) United States Patent
Neumann (10) Patent No.: US 11,122,877 B2
(45) Date of Patent: Sep. 21, 2021

(54) LIGHTED EVENING HANDBAG WITH ADJUSTABLE LUX FLEXIBLE LED PANEL ILLUMINATING REPLACEABLE ARTISTIC TRANSPARENCIES

(71) Applicant: ASLAEN VAUGN, LLC, Mill Valley, CA (US)

(72) Inventor: Evan J. Neumann, Mill Valley, CA (US)

( * ) Notice: Subject to any disclaimer, the term of this patent is extended or adjusted under 35 U.S.C. 154(b) by 49 days.

(21) Appl. No.: 16/704,919

(22) Filed: Dec. 5, 2019

(65) Prior Publication Data

US 2021/0169193 A1  Jun. 10, 2021

(51) Int. Cl.
| | |
|---|---|
| A45C 15/06 | (2006.01) |
| A45C 3/06 | (2006.01) |
| F21V 23/04 | (2006.01) |
| F21S 9/02 | (2006.01) |
| F21V 33/00 | (2006.01) |
| F21W 121/06 | (2006.01) |
| H05B 45/10 | (2020.01) |
| H04W 4/80 | (2018.01) |
| F21Y 115/10 | (2016.01) |

(52) U.S. Cl.
CPC .......... *A45C 15/06* (2013.01); *F21V 33/0008* (2013.01); *A45C 3/06* (2013.01); *F21W 2121/06* (2013.01); *F21Y 2115/10* (2016.08); *H04W 4/80* (2018.02); *H05B 45/10* (2020.01)

(58) Field of Classification Search
CPC ....... A45C 15/06; A45C 3/06; F21V 33/0008; H04W 4/80; H05B 45/10; F21W 2121/06; F21Y 2115/10
See application file for complete search history.

(56) References Cited

U.S. PATENT DOCUMENTS

| | | | | |
|---|---|---|---|---|
| 5,268,827 | A * | 12/1993 | Granneman | A45C 15/06 362/156 |
| 9,116,667 | B1 * | 8/2015 | St. Louis | G06F 1/163 |
| 10,517,364 | B2 * | 12/2019 | Ragans | H01H 36/0046 |
| 10,681,970 | B2 * | 6/2020 | McManus | A45C 13/103 |
| 10,813,428 | B1 * | 10/2020 | Ansell | H05B 45/20 |
| 2004/0017158 | A1 * | 1/2004 | Ang | H05B 39/042 315/149 |
| 2007/0008714 | A1 * | 1/2007 | Kilfedder | A44B 19/24 362/103 |
| 2014/0231277 | A1 * | 8/2014 | Ponski | A45F 5/02 206/38 |

(Continued)

*Primary Examiner* — Tracie Y Green (57) ABSTRACT

An illuminated handbag that includes a body with a base portion, a front panel, a back panel, and a side panel; a flexible LED panel; an annular frame base affixed to the front panel and having an interior opening; an annular frame disposed over and around the perimeter of the LED panel and coupled to the frame base to form a channel; a transparency bearing a decorative image captured in the channel between the LED panel and the frame; a microprocessor for controlling the LED panel; a power supply coupled to the microprocessor; and an on-off and dimming switch connected to the microprocessor and the LED panel. The LED panel provides backlight illumination through the transparency. The microprocessor enables automatic adjustment to the light output responsive to the lux of ambient light multiplied by a default factor and/or user-defined multipliers.

16 Claims, 6 Drawing Sheets

(56) References Cited

U.S. PATENT DOCUMENTS

2016/0316879 A1* 11/2016 Armstrong .......... F21V 33/0004
2017/0153019 A1*  6/2017 Tait ...................... F21V 3/0625
2020/0124240 A1*  4/2020 Jeong .................... F21V 3/049

* cited by examiner

LIGHTED EVENING HANDBAG WITH ADJUSTABLE LUX FLEXIBLE LED PANEL ILLUMINATING REPLACEABLE ARTISTIC TRANSPARENCIES

CROSS REFERENCES TO RELATED APPLICATIONS

Not applicable. The present application is a first-filed United States Utility Patent Application.

STATEMENT REGARDING FEDERALLY SPONSORED RESEARCH OR DEVELOPMENT

Not applicable.

THE NAMES OR PARTIES TO A JOINT RESEARCH AGREEMENT

Not applicable.

INCORPORATION BY REFERENCE OF MATERIAL SUBMITTED ON A COMPACT DISC

Not applicable.

SEQUENCE LISTING

Not applicable.

BACKGROUND OF THE INVENTION

Field of the Invention

The present invention relates generally to apparel accessories, and more particularly to fashion handbags and handbags, and still more particularly a handbag having an adjustable luminosity LED panel on one or more outside surfaces, wherein the LED panel is covered by (and therefore illuminates) a transparency film or vellum paper bearing an artistic photograph or design. In another instance it may shine through other art or stones such as stained glass, resin, crystal or other semi-opaque substrate.

Background Discussion

The use of a controllable lighted display, including LED and OLED panels, on clothing and various other worn or accessory articles is known. Illuminated handbags are also known. Iterations of flexible LED panels in worn articles and accessories have been the subject of patents as follows:

U.S. Pat. No. 9,857,968, to Khalid et al, teaches wearable articles having a supplemental display unit (SDU) which may display content based on information received from an existing mobile device near the wearable article. The mobile device may exchange information with the SDU over a wireless connection and/or a wired connection. The received information may include, for example, call and/or text message notifications, calendar items, status information regarding the mobile device, etc. Additionally or alternatively, other information for display may be generated by the SDU itself based on sensors within the SDU, and/or in conjunction with information received by the mobile device (e.g., position). Such information may include contextual information (e.g., travel and/or promotional information) and/or information providing an inventory of the contents (e.g., keys, wallet, etc.) within the wearable article. Regardless of the information source, the SDU may integrate, format, and/or display information as viewable content.

U.S. Pat. No. 9,939,145, to Tait, disclosures a purse illumination assembly, including a power source, a light emitting portion, a switching means, and a circuit assembly connecting the light emitting portion to the power source through the touch-sensitive switch. The light emitting portion includes a light emitting fabric, and the switch may be located in an indentation to protect against accidental switching on.

U.S. Pat. No. 10,401,003, to Walker et al, describes a piece of fabric with LEDs disposed in a slot formed in the fabric. The LEDs may be illuminated in response to motions detected by a motion sensor measuring a motion parameter of the fabric when the motion parameter exceeds a motion threshold.

In May of 2019, Louis Vuitton unveiled a smart purse with an active-matrix organic light-emitting diode (AMOLED) screen. See: https://www.youtube.com/watch?v=aGpZgXUC2Iw The foregoing art reflects the current state of the art of which the present inventor is aware. Reference to, and discussion of, these patents is intended to aid in discharging Applicant's acknowledged duty of candor in disclosing information that may be relevant to the examination of claims to the present invention. However, it is respectfully submitted that none of the above-indicated references disclose, teach, suggest, show, or otherwise render obvious, either singly or when considered in combination, the invention described and claimed herein.

Specifically, none of the references teach a light diffusing LED panel backlight for a handbag intended to create a more perfect backlight for sculpted, painted, blown, printed, developed or otherwise artificially produced art. Nor do the references teach a purse having a light output responsive to the lux of ambient light multiplied by a default factor and/or user-defined multipliers, features which are found in the present invention.

BRIEF SUMMARY OF THE INVENTION

The present invention solves the problem of displaying and seeing decorative evening handbags in dim evening or night lighting, as is found in dimly lit settings such as restaurants, clubs, bars and private parties. The invention is a handbag having at least one side provided with an LED driven panel light which produces dimmable light over a broad range using pulse width modulation controlled by a microcontroller. The LED driven panel provides back lighting for illuminating an artistic design copied, printed or emulsion developed onto a transparent or semi-transparent film bearing an artistic image or design. In another instance, a light sensor measures ambient light and provides signal to the microcontroller, which brightens or dims the LED panel in accordance with a luminosity formula based on the background (ambient) lux and pulse intensity multiplied by a user-determined multiplier. In another instance, a sound sensor is used to determine background noise levels and music tempos to incorporate into the luminosity formula. In embodiments, the user-determined multiplier is a value spanning a range with low values corresponding to less activity, stable (consistent and persistent) ambient light, and a user mood (e.g., introverted, shy), with increasingly high values corresponding to increased activity, louder or faster music, pulsing or strobing ambient light, and a more outgoing or expansive user mood.

The side emitting LED driven backing lamp subtly lights the artwork developed or printed on a transparency to be seen in low light conditions. Optionally, agate, glass or other natural or artificial transparent or semi-transparent medium may be employed. This sharply displays the artwork and attracts spectator eyes to the wearer, thus ensuring the effect of a desired communication and social impact, and increasing the likelihood that the handbag will attract the notice of others. This provides users with an opportunity to communicate something about themselves while subtly drawing attention to themselves.

The decorative elements, namely, a transparent film with an artistic image embedded or applied, are captured on the surface of the handbag and over the LED backlight panel with a pocket. The pocket includes a narrow lip that retains the transparency at its edges. When the user wishes, he/she can grasp the transparency between two fingers and pinch it slightly to remove the image from the frame and to change transparencies to display other artwork, including artwork of their own design.

The variable luminosity LED panel enables the artwork to be displayed in an understated or subtle manner, or pulsing, openly and flamboyantly. In either case, the artistic feature can be seen and enjoyed in all but direct sunlight conditions. The lighting does more than simply illuminate the artwork; it actively and positively draws spectators' eyes to the handbag to ensure notice.

The foregoing summary broadly sets out the more important features of the present invention so that the detailed description that follows may be better understood, and so that the present contributions to the art may be better appreciated. There are additional features of the invention that will be described in the detailed description of the preferred embodiments of the invention which will form the subject matter of the claims appended hereto.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Referring to FIGS. 1 through 6, wherein like reference numerals refer to like components in the various views, there is illustrated therein an inventive lighted evening handbag having an LED panel backlight used to illuminate an artistic design borne by a replaceable transparency.

Referring to FIGS. 1 through 4A, wherein like reference numerals refer to like components in the various views, there is illustrated therein a new and improved evening fashion handbag, generally denominated 10 herein. In embodiments, the body of the inventive handbag includes a rigid or semi-rigid base portion 12 connected to a rigid or semi-rigid front panel 14, and a rigid or semi-rigid back panel 16. The base portion is entirely or generally continuous with a side panel 18 which defines a continuous bottom, side, and top side of the handbag which may be rounded or any other shape. In another instance, discussed more fully below, ballast provided by other elements in the article keep the otherwise unstable handbag from rocking from side to side.

Figure 1:
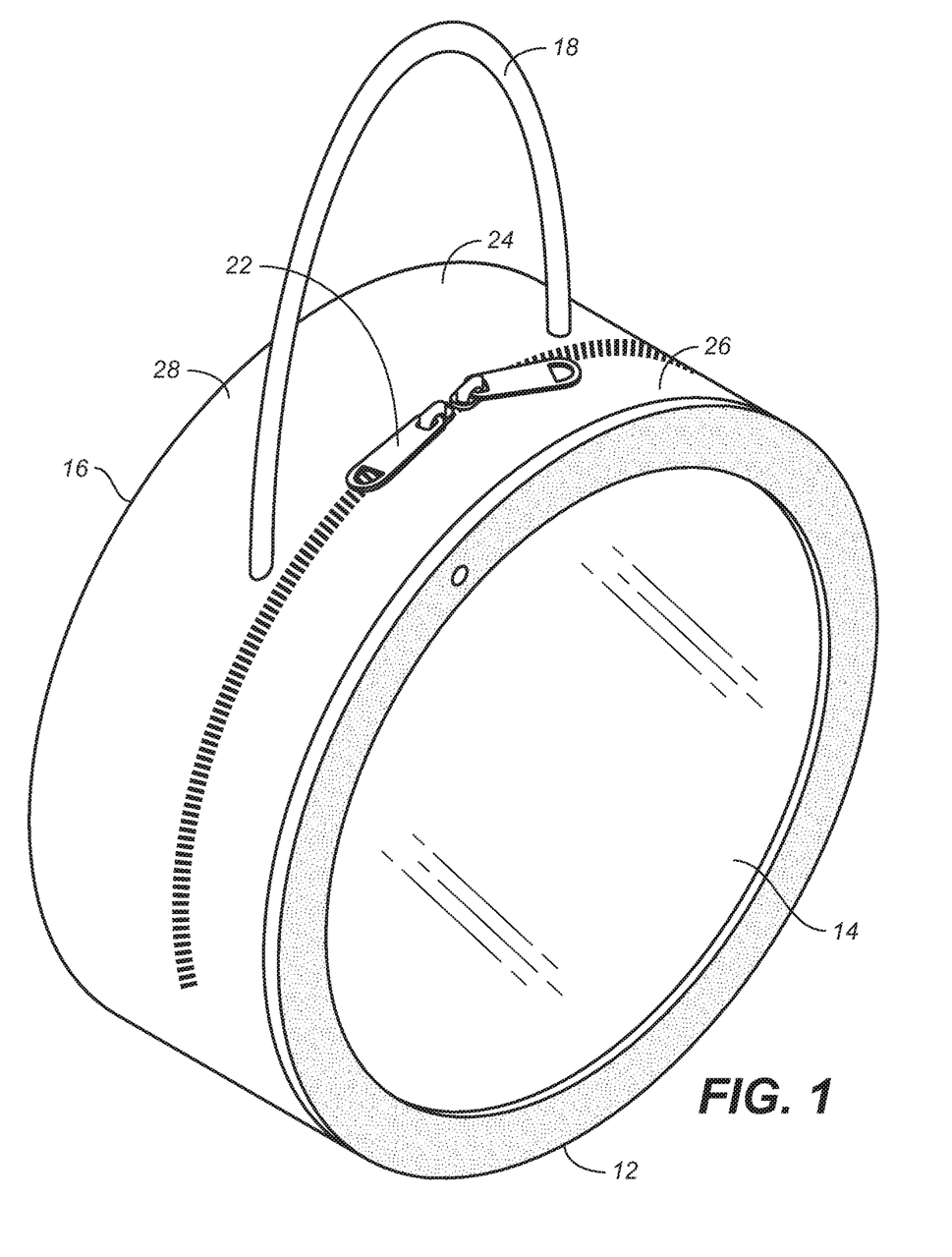
FIG. 1 is an upper front perspective view of the handbag of the present invention.
Figure 2:
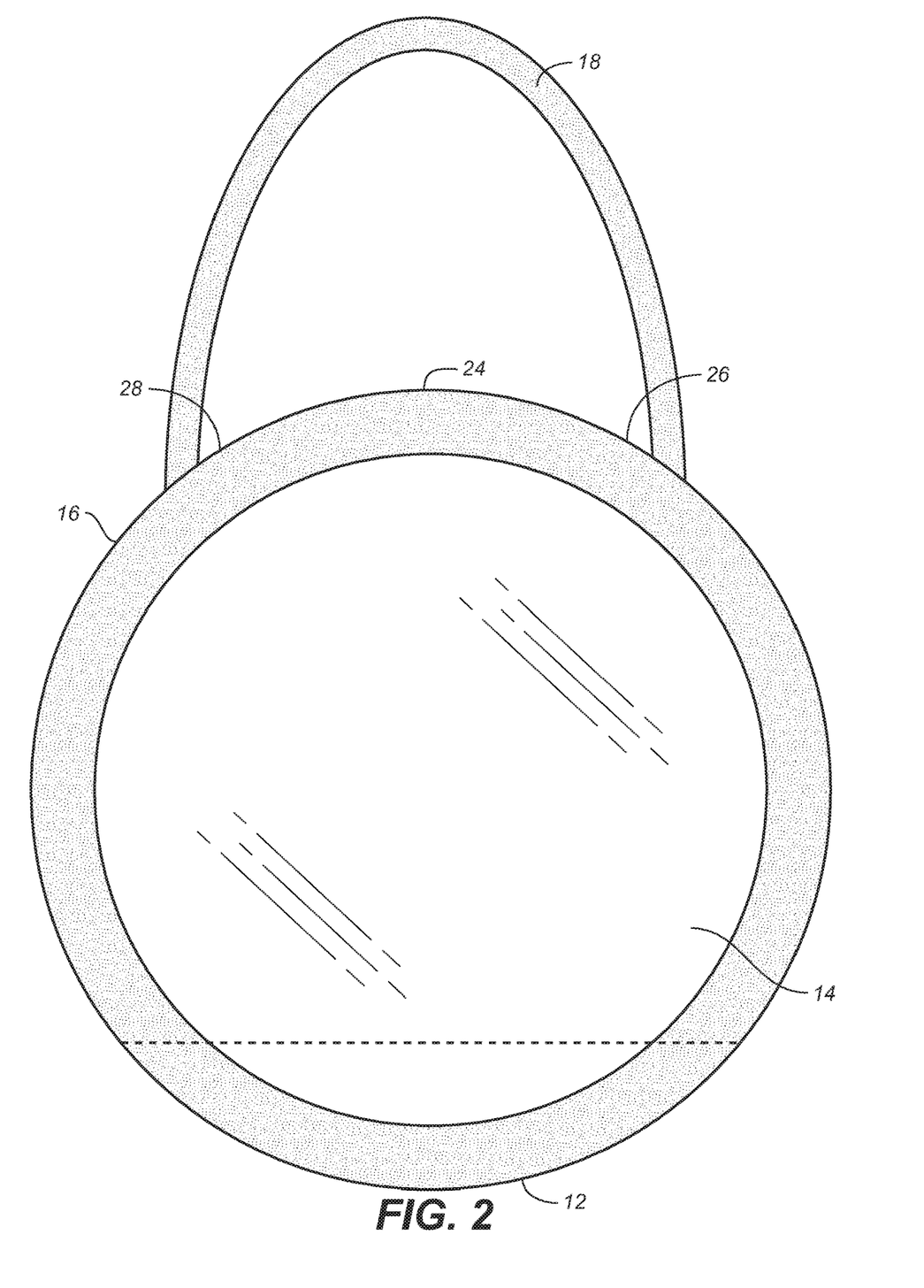
FIG. 2 is a front view in elevation thereof.
Figure 3:
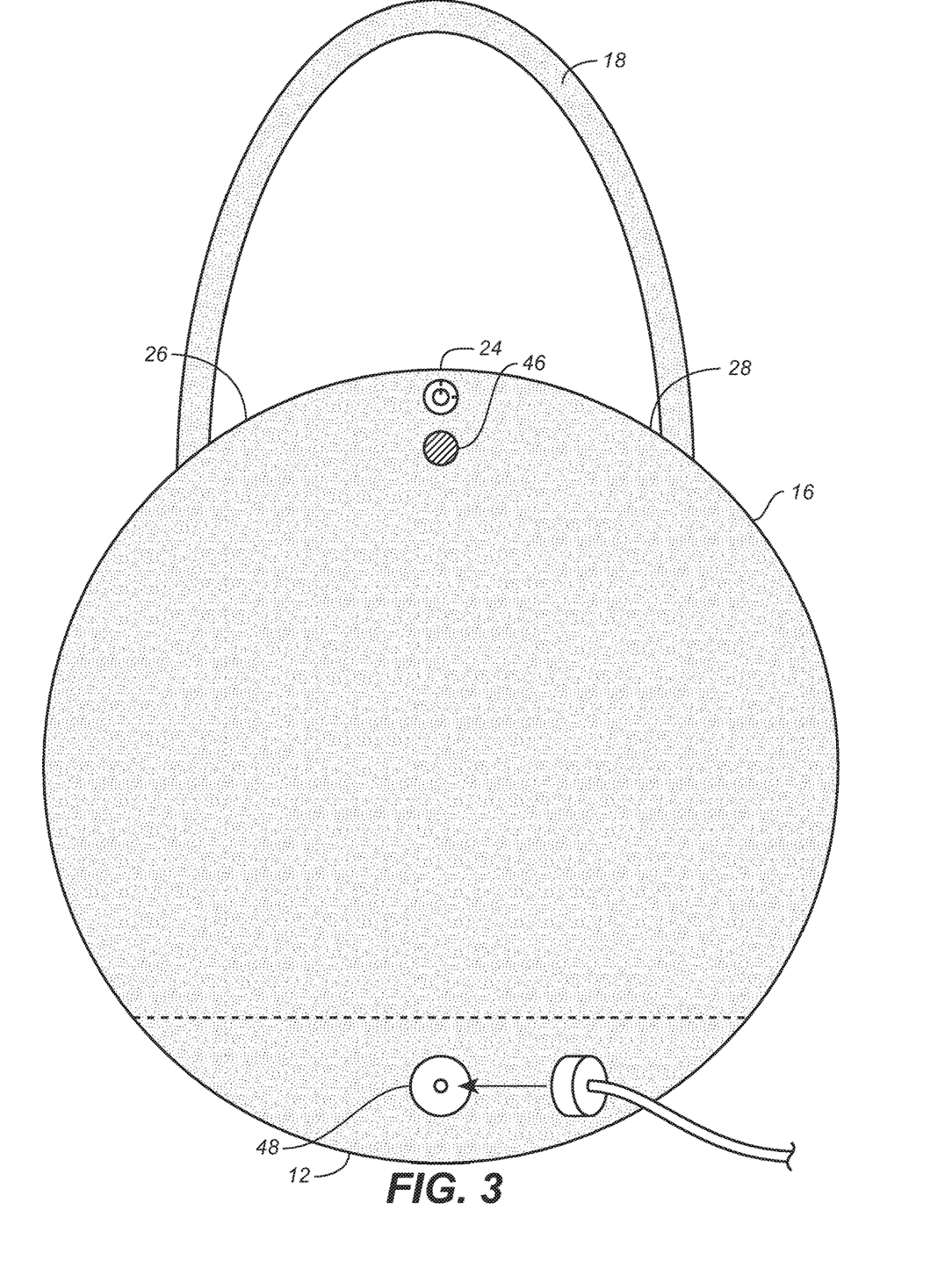
FIG. 3 is a rear view in elevation thereof.

Flexible or rigid handles or straps 20 are disposed at the tops of the panels, and a magnetic or other closure apparatus (clasp or zipper) 22 is provided proximate the top 24 of the handbag for connecting and closing the front and rear portions of the handbag 26, 28, respectively. The front and rear portions may be fully hinged at the base portion so as to open in a clamshell fashion, or they may be divided by the opening on only a portion of the side so as to provide access to the handbag interior only along an upper portion of the handbag.

The rounded configuration is one of many possible configurations, but it nicely complements other artistic elements inherent in the handbag. Additionally, it provides a more uniform and symmetrical frame for the lighted artistic images displayed on the front 14 of the handbag. However, in embodiments, the rounded shaped may be replaced with any of a number of suitable shapes, as long as they are configured so as to provide a surface on which an artistic panel can be displayed.

Figure 5:
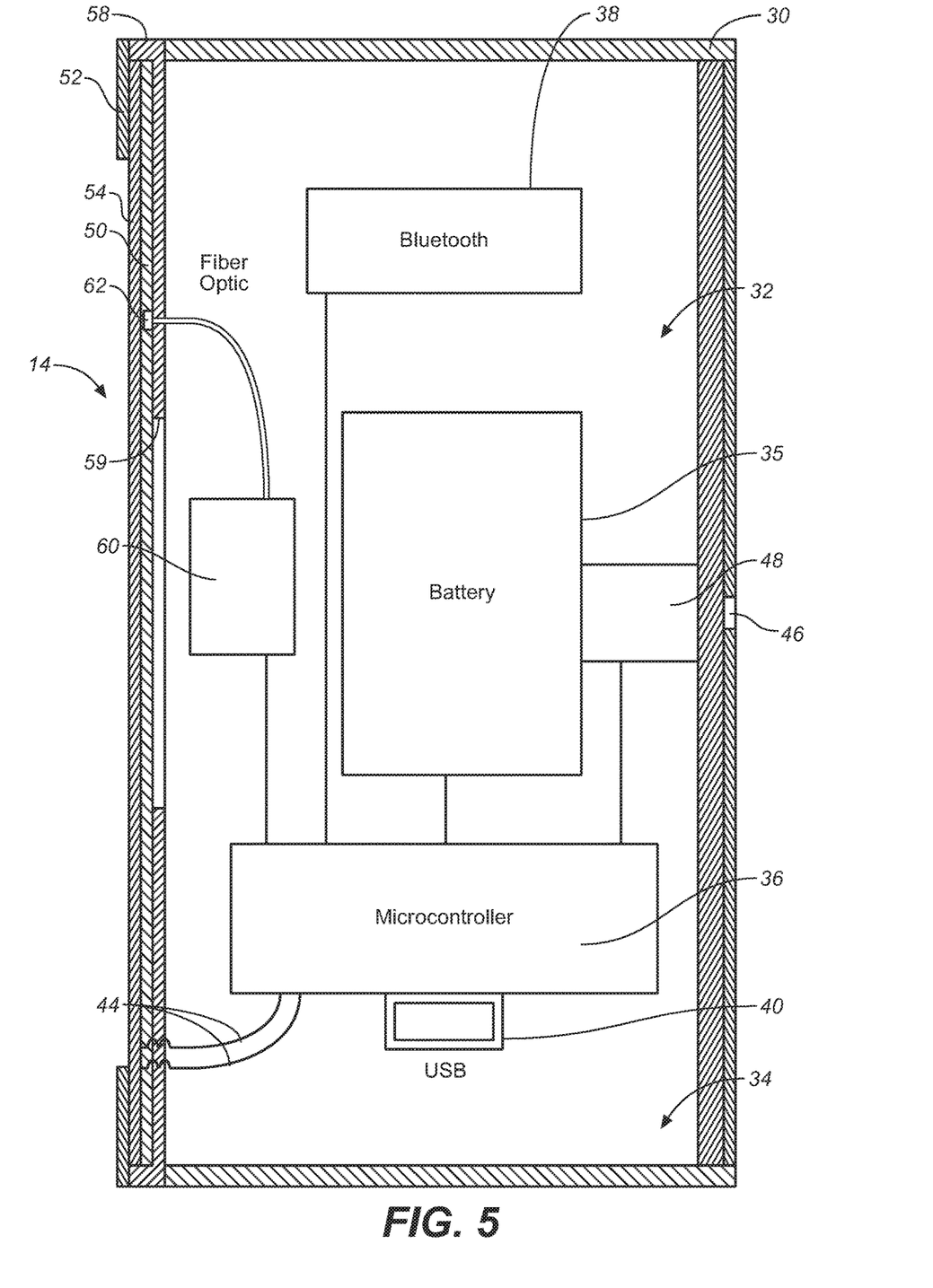
FIG. 5 is a schematic cross-sectional side view in elevation showing the power supply and electronic components for powering and controlling the luminosity of the flexible LED panel backlight.

In embodiments, the handbag interior includes an electronics case 30 defining an interior volume having a base portion 34 which is generally arcuate and conforms to the shape of the continuous handbag bottom side. A battery 35 or multi-battery stack holder is disposed in this base portion to provide a power source for system electronics, and importantly to provide ballast for the unstable handbag. In another instance, a Bluetooth antenna, receiver, and adapter 38 are also connected to the microprocessor for sending and receiving data or control signals from nearby Bluetooth-enabled connected devices for controlling light output and remotely turning the LED panel on and off and for other functions. Controls may be simple on/off inputs or luminosity settings, as discussed more fully below. In another instance, a USB port 40 is also provided for transmitting data to and from, and/or programming or reprogramming the microcontroller.

As is shown in FIG. 5, the battery/battery pack is electrically connected to a microcontroller 36. Power is provided to a flexible LED panel 50 by leads 44 from the microcontroller and switched by the action of a dimmer/on-off switch 46 acting on the microcontroller located next to a magnetic charging receiver 48. The switch controls both on-off current to the flexible LED panel 50 and enables manual control of luminosity and other functions, as desired by the user.

Figure 4:
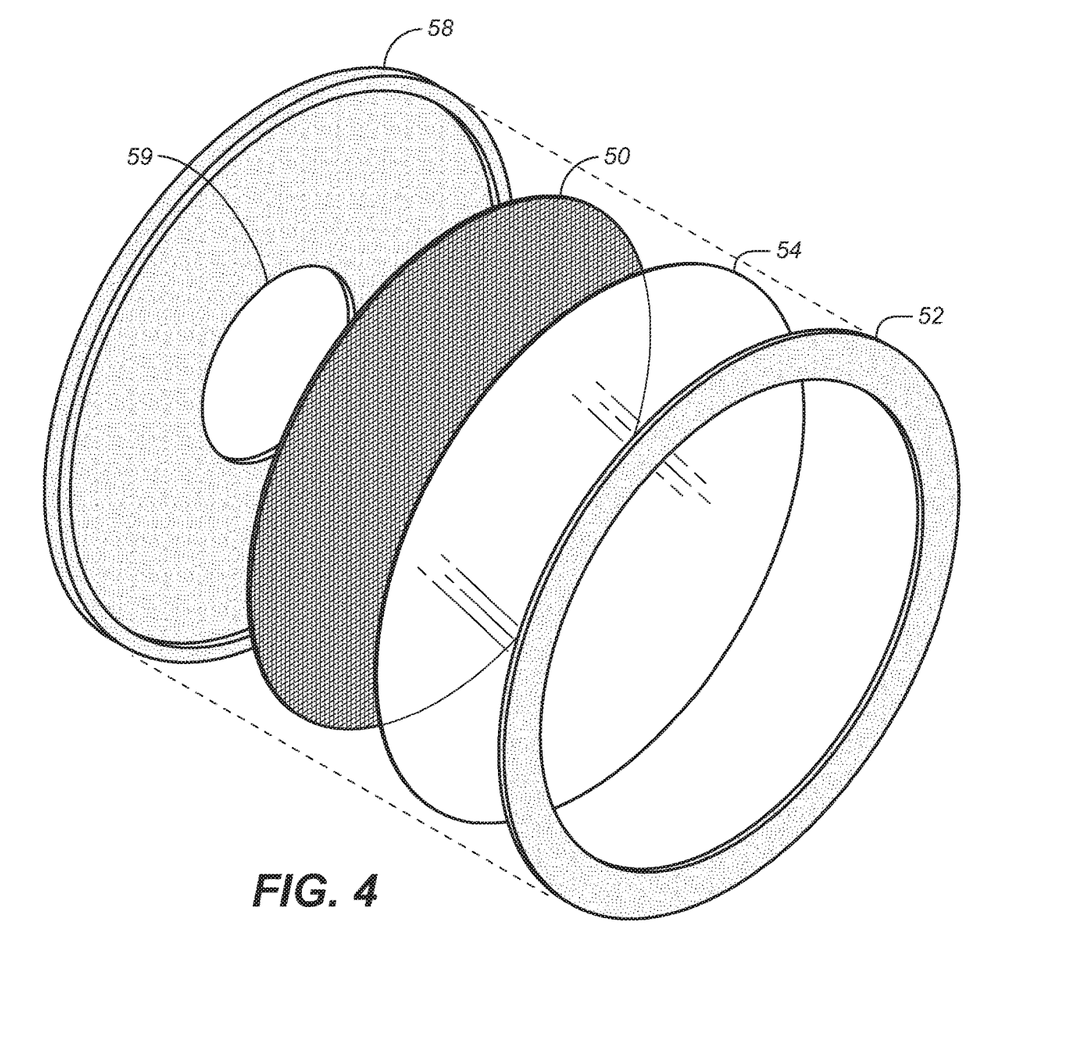
FIG. 4 is an exploded perspective view of the backlighting flexible LED panel and artistic transparency assembly.

The artistic display assembly includes the flexible LED panel 50 as well as an annular frame 52, between which is captured an artistic transparency. The panel may comprise evenly spaced LED bulbs disposed in a matrix throughout the area of the panel, or LED bulbs may be disposed generally around all or a portion of the perimeter of the panel, with the emitted light diffused across the panel surface so as to make the luminosity uniform and to eliminate bright or dark spots. The LEDs in the panel are driven by the microprocessor using pulse width modulation. The panel is secured to the surface of the handbag with the frame and frame base combination so as to provide a secured substrate to backlight the transparency.

Frame elements including an annular frame ring 52 (simply "frame" herein), and an annular frame base 58, may be integrally formed from textile or leather flaps or provided as separate elements, and together they are disposed on the front side of the handbag to hold and display the artistic transparency 54. The frame 52 is an annular retaining ring with a circumferential edge disposed fully or at least partially around the edge of the LED panel and captures the transparency 54 either by clasping it to the LED panel and handbag side or by providing a channel into which the edge of the transparency is disposed. In an embodiment, the channel is formed by attaching the circumferential edge of the frame 52 to the circumferential edge of the frame base 58 so as to form an annular channel. The frame base, in turn, is affixed (glued, welded, or sewn) to the side of the handbag. To facilitate easy and rapid removal of the transparency, the frame preferably includes a selectively detachable or bendable edge portion 52 that may be fully or partially pulled away from the frame base 58 to a degree sufficient to create access via an increased gap or opening for the insertion and removal of the transparency. In another instance, the fastening feature may comprise complementary hook and loop material, magnets, latches, or other means to affix the frame to the frame base so as to capture the LED panel on the handbag side such that the transparency may be secured after it is installed. The frame and its base, the LED panel, and the transparency sizes may be optimized for easy access, removability, secure capture, and design presentation.

The diameters of the frame, frame base, LED panel, and transparency elements will differ according to both design and functional considerations, and the views should therefore not be considered limiting. However, in embodiments, frame 52 is configured as a ring, as is frame base 58. The interior opening 59 of frame base 58 is substantially smaller than the opening in frame 52, and the opening 59, or a portion thereof, may extend into the interior portion of the handbag, so as to provide illumination from the LED panel to the compartment interior, and thereby to compartment contents. The outer diameter of transparency 54 is slightly greater than the inner diameter of frame 52, but slightly less than the outer diameter of frame 52. The outer diameter of frame base 58 (and thus the perimeter or circumferential edge) is approximated to the circumferential edge of frame 52, and then affixed to the side of the handbag. The inner diameter and outer diameter of frame 52, and greater than the outer diameter of transparency 54.

As will be readily appreciated, the transparencies may be copied or printed on any suitable transparency film material now available for use with color and black and white printers and copiers. Accordingly, any of an infinite number of designs and images may be imposed on the substrate. Thus, a different handbag design can be enjoyed at the whim and will of the owner.

In another embodiment, included in the electronics package is a light sensor 60 having an extrinsic sensor 62 disposed in or near the LED panel surface. The light sensor receives light from the extrinsic sensing element 62 and generates a digital output signal indicating the intensity and flux patterns of ambient light for the environment in which the handbag is located.

Figure 6:
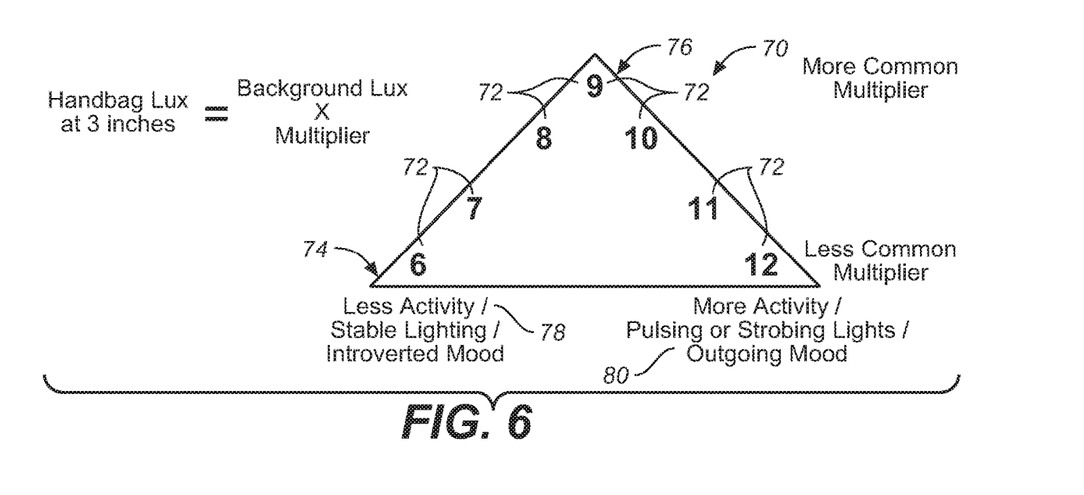
FIG. 6 is a graphic representation showing permutations of the formula for adjusting the LED panel lux according to ambient light lux multiplied by a user-defined multiplier.

The microprocessor, in turn, may be preprogrammed to adjust the light output (either lumens or lux, but preferably lux) of the flexible LED panel according to a default setting, wherein the output lux is a function of the measured background lux multiplied by a common multiplier, the factors graphically represented 70 in FIG. 6. The common multipliers 72 may be numerically represented with a range from, for example, 6 to 12, with numbers at each of the high and low ends of the range representing less common multipliers 74, and numbers in the middle portion of the range representing most common multipliers 76. The numbers relate to three factors, all of which are arbitrarily correlated to a kind of intensity that maps onto luminosity. Thus, an event or environment that includes less activity and has more stable lighting, and a user that is in more of a restrained, shy, or introverted mood 78, would use a multiplier on the lower end of the scale (think: study group in a law library). An event or environment involving more activity and pulsing or strobing ambient light with a user in an outgoing and expansive mood 80 would use a multiplier on the upper end of the scale (think: teenager at a rave). A default setting might involve using the precise middle of the scale, or perhaps either a more restrained or more expressive option as determined according to user preferences. However, on an ad hoc basis, the user can override the default setting and provide any number in the scale as the multiplier to be coupled with the measured background lux or choose an arbitrary lux setting The user may also choose to use a pulsing setting in extremely active environments, for instance a sales display or a rave dance event.

In embodiments, the formula may be to generate a light output from the LED panel having a lux value at three (3) inches from the panel surface that is equal to the background lux multiplied by the multiplier. Calculations for number on the range are simple and arithmetic.

Thus, in embodiments, using the above-described formula, the lux emitted at 3 inches distance from the handbag will be found to be approximately within the range of 5-8 lux (6.6667 is the median) times as high as background lux.

From the foregoing, it will be seen that in its most essential aspect, the present invention is an illuminated handbag that includes a body with a base portion, a front panel, a back panel, a side panel and an interior portion; an opening disposed in the side panel of the handbag body; a flexible LED panel having an array of LED bulbs; an annular frame disposed over and around the perimeter of the LED panel; an annular frame base affixed to the front panel and having an opening to the handbag interior, wherein the LED is secured between the frame and frame base and may provide illumination both to the handbag interior and forward and away from the front panel; a transparency bearing a decorative image selectively captured between the LED panel and the frame in a channel formed by the connected circumferential edges of the frame and frame base; a microprocessor for controlling the LED panel using pulse width modulation; a power supply coupled to the microprocessor; an on/off and dimming switch connected to the microprocessor and the LED panel; wherein the LED panel provides backlight illumination through the transparency and interiorly, and the microprocessor includes executable instructions that enable a user to define the output lux of the LED panel.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, controllers, operational features or the like.

Therefore, the above description and illustrations should not be construed as limiting the scope of the invention, which is defined by the appended claims.

What is claimed as invention is:

1. An illuminated handbag, comprising:
    a handbag body having a base portion, a front panel, a back panel, a side panel, and an interior portion;
    an opening disposed in said side panel of said handbag body;
    an LED panel having an array of LED bulbs configured to diffuse evenly through the front panel, said LED panel having a perimeter and having a backside with a portion exposed to said interior portion to provide illumination of contents contained therein;
    an annular frame base affixed to said front panel, said frame base having a circumferential edge and an interior opening;
    an annular frame ring having a circumferential edge attached to said frame base so as to form a channel in which said perimeter of said LED panel is captured and secured;
    a transparency bearing a decorative image or other art captured between said LED panel and said annular frame ring;
    a microprocessor for controlling said LED panel using pulse width modulation;
    a power supply coupled to said microprocessor; and
    an on-off and dimming switch connected to said microprocessor;
    wherein said LED panel provides backlight illumination through said transparency or other art and said microprocessor includes executable instructions that enable a user to define the output lux of said LED panel.

2. The illuminated handbag of claim 1, further including a light sensor disposed on a surface of said handbag for measuring ambient light, said light sensor providing a non-transitory signal to said microcontroller, which brightens or dims said LEI) panel in accordance with a luminosity formula based on the background ambient lux multiplied by a user-determined multiplier in a numerical range between 6 and 12, inclusive.

3. The illuminated handbag of claim 2, wherein the user-determined multiplier is a value spanning a range with low values corresponding to numerical values assigned to an environment in which low activity will be present and with stable ambient light, and a retiring user mood, wherein increasingly high numerical values correspond to increased activity in the environment, puking or strobing, ambient light, and a more outgoing or expansive user mood.

4. The illuminated handbag of claim 1, wherein said transparency is captured on a surface of said handbag and over said LED panel with a pocket having a narrow lip that retains said transparency.

5. The illuminated handbag of claim 1, wherein said front panel and said back panel are round, and rounded on said base portion, and wherein said power supply is disposed in a bottom portion of said handbag on said base portion and provides ballast to keep said handbag in a generally upright orientation when placed on its rounded base portion on a flat surface.

6. The illuminated handbag of claim 5, wherein said base portion is rigid or semi-rigid.

7. The illuminated handbag of claim 6, wherein said front panel and said rear panel are rigid or semi-rigid.

8. The illuminated handbag of claim 7, wherein said handbag is divided into a front portion and a rear portion separated by a closure.

9. The illuminated handbag of claim 8, further including a Bluetooth antenna, receiver, and adapter connected to said microprocessor for sending and receiving data from nearby Bluetooth-enabled connected devices for controlling light output and remotely turning said LED panel on and off.

10. The illuminated handbag of claim 1, further including a Bluetooth antenna, receiver, and adapter connected to said microprocessor for sending and receiving data from nearby Bluetooth-enabled connected devices for controlling light output and remotely turning said LED panel on and off.

11. The illuminated handbag of claim 1, further including a USB port for transmitting data to and from and programming said microcontroller.

12. The illuminated handbag of claim 1, wherein power is provided to said LED panel by leads from said microcontroller and switched through a dimmer/on/off switch located immediately next to a magnetic charging receiver.

13. The illuminated handbag of claim 12, wherein said dimmer/on/off switch controls both on/off current to said LED panel and enables manual control of luminosity of said LED panel.

14. The illuminated handbag of claim 1, wherein said transparency is captured and secured against said LED panel with an annular fabric frame having a selectively detachable edge portion separable from said frame base to a degree sufficient to create an opening for the insertion and removal of said transparency.

15. The illuminated handbag of claim 1, further including a light sensor with an extrinsic sensing element disposed on a surface of said handbag for measuring ambient light, said light sensor providing a non-transitory signal to said microcontroller to brighten or dim said LED panel, wherein said light sensor receives light from said extrinsic sensing element and generates a non-transitory digital output signal indicating the intensity of ambient light for the environment in which the handbag is located.

16. The illuminated handbag of claim 15, wherein said microprocessor is preprogrammed to adjust light output from said LED panel such that the output lux is a function of the measured background lux multiplied by a user-determined common multiplier in a numerical range between 6 and 12, inclusive.

* * * * *